United States Patent
Robinson-Morgan et al.

(10) Patent No.: US 12,105,825 B2
(45) Date of Patent: Oct. 1, 2024

(54) SYSTEMS AND METHODS FOR USE IN SECURING BACKUP DATA FILES

(71) Applicant: MASTERCARD INTERNATIONAL INCORPORATED, Purchase, NY (US)

(72) Inventors: Bryn Anthony Robinson-Morgan, Mosborough Village (GB); Liang Tian, Rye Brook, NY (US); Prashant Sharma, Madison, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/381,588

(22) Filed: Oct. 18, 2023

(65) Prior Publication Data

US 2024/0045982 A1    Feb. 8, 2024

Related U.S. Application Data

(63) Continuation of application No. 17/462,513, filed on Aug. 31, 2021, now Pat. No. 11,822,686.

(51) Int. Cl.
| | |
|---|---|
| *G06F 21/62* | (2013.01) |
| *G06F 11/14* | (2006.01) |
| *G06F 21/32* | (2013.01) |
| *G06F 21/60* | (2013.01) |
| *G06F 21/78* | (2013.01) |
| *G06F 21/10* | (2013.01) |

(52) U.S. Cl.
CPC ...... *G06F 21/6218* (2013.01); *G06F 11/1464* (2013.01); *G06F 11/1469* (2013.01); *G06F 21/32* (2013.01); *G06F 21/602* (2013.01); *G06F 21/78* (2013.01); *G06F 21/107* (2023.08)

(58) Field of Classification Search
CPC .... G06F 21/6218; G06F 21/32; G06F 21/602; G06F 21/78; G06F 21/107; G06F 21/6209; G06F 11/1464; G06F 11/1469
See application file for complete search history.

(56) References Cited

U.S. PATENT DOCUMENTS

| | | | |
|---|---|---|---|
| 8,667,281 B1 | 3/2014 | Chenna | |
| 9,990,512 B2 * | 6/2018 | Erofeev | ............... H04L 9/0897 |
| 11,822,686 B2 * | 11/2023 | Robinson-Morgan | ...................... G06F 11/1469 |
| 2005/0283662 A1 * | 12/2005 | Li | ....................... G06F 11/1469 714/13 |

(Continued)

*Primary Examiner* — Han Yang
(74) *Attorney, Agent, or Firm* — Harness, Dickey & Pierce, P.L.C.

(57) ABSTRACT

Systems and methods are provided for backing up a data file. One example computer-implemented method includes generating an L4 key and, for each contact attribute of the data file, generating an L3 file including the L4 key and an identifier of a user and encrypting the L3 file with an un-masked version of the contact attribute. The method also includes compiling the encrypted L3 file(s) and the masked version(s) of the contact attribute(s) into an L2 file, generating an L2 key, encrypting the L2 file with the L2 key, compiling the encrypted L2 file and L2 key into an L1 file, generating an L1 key, encrypting the L1 file with the L1 key, compiling an L4 file to include identity attributes of the user, encrypting the L4 file with the L4 key, and combining the encrypted L4 file and the encrypted L1 file.

18 Claims, 5 Drawing Sheets

(56) References Cited

U.S. PATENT DOCUMENTS

| | | | |
|---|---|---|---|
| 2007/0028108 A1* | 2/2007 | Cowburn | G06F 18/00 |
| | | | 713/172 |
| 2008/0260156 A1* | 10/2008 | Baba | G06F 21/34 |
| | | | 726/2 |
| 2010/0242102 A1* | 9/2010 | Cross | H04L 63/0861 |
| | | | 380/278 |
| 2011/0016317 A1* | 1/2011 | Abe | H04L 9/3231 |
| | | | 713/169 |
| 2020/0013051 A1 | 1/2020 | Kadiwala et al. | |
| 2020/0021567 A1 | 1/2020 | Salgaonkar et al. | |
| 2020/0193420 A1 | 6/2020 | Vogel et al. | |
| 2023/0063632 A1 | 3/2023 | Robinson-Morgan et al. | |

\* cited by examiner

SYSTEMS AND METHODS FOR USE IN SECURING BACKUP DATA FILES

CROSS-REFERENCE TO RELATED APPLICATION

This application is a continuation of U.S. patent application Ser. No. 17/462,513, filed on Aug. 31, 2021. The entire disclosure of the above application is incorporated herein by reference.

FIELD

The present disclosure is generally directed to systems and methods for use in securing backup data files, and in particular, to providing layer protection to backup data files, through various keys, which may be suitable for multi-host recovery.

BACKGROUND

This section provides background information related to the present disclosure which is not necessarily prior art.

Users may be associated with data files, which reflect identities of the users. The data files may be specific to particular parties (e.g., particular merchants, etc.), whereby the users establish the data files with the particular parties or with applications associated therewith, etc. The data files are then stored in various places, including, for example, smartphones of the users or identity providers associated with establishing virtual identities for the users. When stored in smartphones, for example, via applications, the applications may use the data files to provide identity attributes to one or more relying parties, in connection with services associated with the applications.

DRAWINGS

The drawings described herein are for illustrative purposes only of selected embodiments and not all possible implementations, and are not intended to limit the scope of the present disclosure.

FIG. 3 illustrates an example method, which may be implemented in connection with the system of FIG. 1, for;

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

When a user interacts with a service, or party, where the identity of the user is relevant, the user is often invited to enroll his/her identity with the service and/or party. The party or service may then rely on the identity, for example, in the form of a data file, to provide service(s) to the user, etc. From time to time, the user may decide to use a certain application, or device, for example, whereby a need may exist to transfer the data file to the application or device. Additionally, the user may misplace a device, which may include the data file and/or an application dependent on the data file, whereby the user may be required to re-enter the data included in the data file upon replacing the device or restarting the application.

Uniquely, the systems and methods herein provide for securing data files, through use of layered keys for authentication, whereby the data files are usable, after authentication, to restore the data files to hosts. In particular, for a given data file for a user, which includes various attributes about the user (e.g., identifying information, etc.), it may be necessary or desirable to compile a backup data file for purposes of restoration (e.g., for moving to a new device or application, for replacing a lost or damaged device, etc.), whereby the user is permitted to leverage the backup data file rather than re-enter and re-verify the underlying attributes. As such, the attributes are compiled into a backup data file, which is secured with various layers of keys. The backup data file may use or implement the layers of security based on biometric and contact attribute authentications, which are coordinated apart from the user's device, to provide a key that enables the attributes of the user to be accessible and stored in memory of a host (e.g., a new mobile device, etc.), and used as appropriate. In this manner, the layered keys are employed for authentication to provide efficient and complete security for a backup data file, which is accessible only through authentications of the user.

Figure 1:
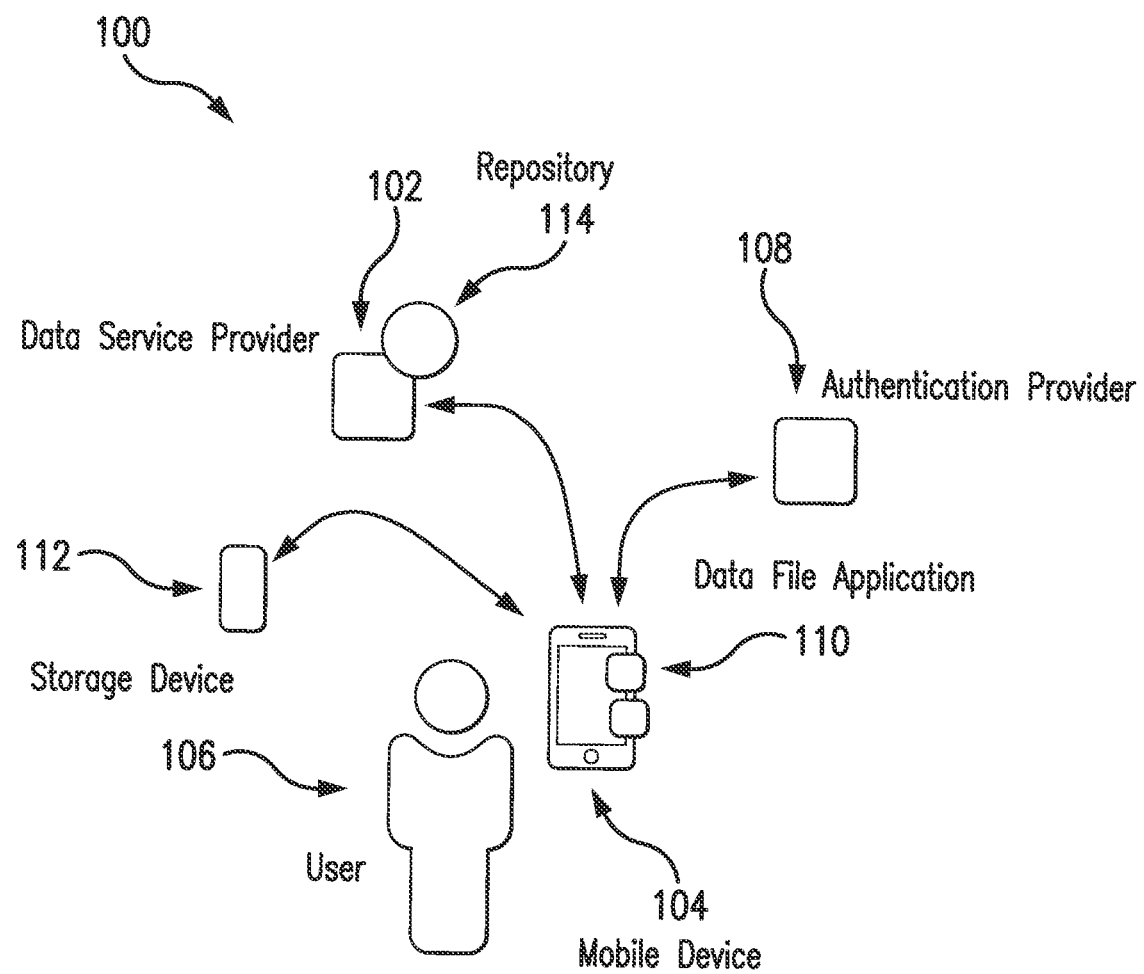
FIG. 1 illustrates an example system of the present disclosure suitable for use in securing backup data files.

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, particular types of users and/or data associated with the users, and/or privacy requirements, etc.

The system 100 generally includes a data service provider 102, a mobile device 104 associated with a user 106, and an authentication provider 108, each of which is coupled to one or more networks to provide communication therebetween. The network(s) is/are indicated generally by arrowed lines in FIG. 1, and each may include one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

The data service provider 102 of the system 100 generally is configured to compile data files for users, including the user 106. The data service provider 102 may be part of an identification provider, or other platform related to digital identities, or may be related to mobile devices or applications associated with mobile devices, etc. In this example embodiment, the data service provider 102 provides a data file application 110, which is installed in the mobile device 104. The user 106 may then be able to manage his/her data file(s), as compiled by the data service provider 102, through the file application 110 (e.g., request updates to the data file, request to backup the data file, etc.). The data file application 110 may be a standalone application in the mobile device 104, or may include a software development kit (SDK), which is integrated in whole or in part in an application installed at the mobile device 104, etc. In one specific embodiment, a digital identity application (not shown) is included in the mobile device 104, and the data file application 110 is a SDK in the digital identity application.

It should be appreciated that while the data service provider 102 is illustrated as a single entity and/or computing device in FIG. 1, the data service provider 102 may be segregated into multiple different entities and/or computing devices in other embodiments. For example, certain operations described herein with reference to the data service provider 102 may be performed by different entities, where the entities together then perform the operations described herein. That said, as shown in FIG. 1, the data service provider 102 is illustrated as including a repository 114, which is configured to store data, as described below. In the illustrated embodiment, the repository 114 is part of the data service provider 102. However, the repository 114 may be separate from the data service provider 102, in other embodiments, for example, as part of a data center or other entity, etc., yet still configured as described herein.

The mobile device 104 of the system 100 may include a smartphone, a tablet, a PDA, a smartwatch, a laptop, etc., or other computing device that is generally considered portable with the user 106, when the user 106 moves from location to location. In at least one embodiment, though, the mobile device 104 may be replaced by an immobile computing device associated with the user 106, whereby the mobile device 104 may be more generally referenced to herein as a computing device or communication device.

In addition to the mobile device 104, the user 106 is also associated with a storage device 112, which, generally, includes a non-transitory storage device (e.g., a flash memory/card, a USB thumb drive, a cloud account, etc.). The storage device 112 may be physically possessed by the user 106, or not. For example, the storage device 112 may include an allocated storage in a cloud platform, to which the user 106 control access, etc.

The authentication provider 108 includes an entity, or service, associated with authentication of information related to users, including the user 106. In this example embodiment, the authentication provider 108 is configured to provide liveness checking for image capture, and also image capture and signing associated with authentication of a user. The authentication provider 108 is configured to interact with the user 106, via the application 110 in the mobile device 104, for example, or otherwise as suitable for a specific system embodiment.

In this example embodiment, the mobile device 104, via the application 110, for example, and the data service provider 102 are configured to cooperate in compiling and restoring a backup data file for the user 106 (e.g., including personal identifying information (PII) for the user 106, etc.).

In particular, for securing a given data file in the mobile device 104, the mobile device 104 is configured (e.g., by the application 110, etc.) to generate one or more keys, which are designated L1, L2, L3, L4, etc., herein. The L1, L2, L3, L4, etc. keys, as referenced herein, may be generated consistent with the Advanced Encryption Standard (AES), but may be or may include other suitable keys in other embodiments, generally enabled to encrypt and decrypt data based on possession of the key(s), etc. For example, in other embodiments, the generated L1, L2, L3, L4, etc. keys may be consistent with or may further utilize the Rivest-Shamir-Adleman (RSA) asymmetric encryption algorithm. For example, in some embodiments one or more of the keys may utilize the RSA asymmetric encryption algorithm (e.g., L1 and L4 keys may be wrapped with RSA asymmetric keys, etc.) (broadly, a first encryption platform) and one or more of the keys may utilize the AES symmetric encryption algorithm (e.g., L2 and L3 keys may be AES symmetric keys, etc.) (broadly, a second, different encryption platform).

In addition, the mobile device 104, or a third party service (e.g., the data service provider 102, the authentication provider 108, etc.), is configured to generate a masked contact attribute(s) for the user 106, whereby ones of the characters of the contact attribute for the user 106 are masked. Masking may include, for example, obscuring a specific number of characters, or certain characters of the contact attribute. For example, a contact attribute may include the email address john.doe@email.com, whereby the masked contact attribute is john.*@email.com (see, e.g., FIG. 4, etc.). And, another contact attribute may include the phone number 44 078 13579 987, whereby the masked contact attribute is 44 078 13*987 (see, e.g., FIG. 4, etc.).

Next, the mobile device 104 is configured to generate (or create) an L4 key. The L4 key may be generated by the data file application 110, for example, at the mobile device 104, etc. Additionally, the mobile device 104 is configured to compile an L3 file (e.g., including the L4 key, a user identifier for the user 106, and a device identifier (e.g., for the mobile device 104, the application 110, etc.), etc.), and to encrypt the L3 file with the unmasked contact attribute(s) for the user 106. Generally, each contact attribute will be compiled into a different L3 file (e.g., one L3 file for an email address, another L3 file for a phone number, etc.), whereby in some embodiments the data file may include multiple L3 files, which are each encrypted based on different contact attributes.

The mobile device 104 is configured to then compile an L2 file with the encrypted L3 file(s) and the masked contact attribute(s), and to encrypt the L2 file with an L2 key. The mobile device 104 is configured to compile the encrypted L2 file, the L2 key and a biometric of the user 106 (e.g., as obtained from the user 106 at the mobile device 104 (e.g., a selfie, etc.), or as otherwise associated with the data file of the user 106, etc.) into an L1 file, and then to encrypt the L1 file with an L1 key. Further, the mobile device 104 is configured to retrieve a public key from the data service provider 102 (as part of a data service provider public/private key pair), and to wrap (e.g., encrypt, etc.) the L1 key with the public key from the data service provider 102.

The mobile device 104 is configured to also compile an L4 file based on the user's data file (or multiple L4 files where each L4 file includes an attribute or combination of attributes of the data file), and encrypt the L4 file(s) for the user 106, or parts thereof, with the L4 key (e.g., following creation of the L4 key, etc.). In turn, the mobile device 104 is configured to combine the encrypted L4 file(s), the encrypted L1 file, and the wrapped L1 key. The mobile device 104 is configured to then add other data, as appropriate, such as a signature, version, nonce, date, etc. to the combined files, thereby forming the backup data file (or file archive). And, the mobile device 104 is configured to store the backup data file (e.g., compressed or uncompressed, etc.) in the storage device 112. The mobile device 104 is further configured to clear temporary memory, so that the keys, attributes, etc., are deleted, except for as included in the backup data file, and also except for the data file included in secure memory of the mobile device 104 for use by the mobile device 104.

In some embodiments, the mobile device 104 may also be configured to sign the concatenation of the L4 file(s), the L1 file, and the L1 key using a private key of a public-private key pair generated by the mobile device 104 (e.g., a DPri key of a DPub/DPri key pair, etc.). Further, in some example embodiments the mobile device 104 may also (or alternatively) be configured to sign the L4 file(s) using the private key of the public-private key pair generated by the mobile device 104 (e.g., a DPri key of a DPub/DPri key pair, etc.), prior to combining the L4 file(s) with the L1 file and the L1 key.

In the example embodiment, at a later time, the user 106 may opt to restore the mobile device 104 (e.g., for a new device, to restore an old device, to reset an old reset device, etc.), or an application included in the mobile device 104, whereby the attributes are restored, or more generally, provisioned, to the mobile device 104 from the backup data file secured above (as compared to being re-entered and re-verified by the mobile device 104).

When the user 106 opts to do so, the mobile device 104 is configured to retrieve the backup data file from a location designated by the user 106 (e.g., the storage device 112, etc.), or to receive the backup data file from the storage device 112, directly or via another device, etc. In connection therewith, the mobile device 104 is configured to create a new device identifier (e.g., DevID, etc.) for the mobile device 104, or the application, broadly, the host, to which the data file is to be restored.

The mobile device 104 is configured to generate a request for a biometric from the user 106, either directly, or via the authentication provider 108. For the later, the authentication provider 108 is configured to perform a liveness check at an input device of the mobile device 104, to capture an image or other biometric of the user 106, to sign the biometric and to transmit the biometric to the mobile device 104. It should be appreciated that the authentication provider 108 may be integrated, in whole or in part, with the mobile device 104 or the data service provider 102, and still be configured as described herein. For example, the data service provider 102 may be configured to capture a biometric from the user 106 after receipt of the restore request described below. It should be further appreciated that the biometric may include a facial image of the user 106, or a fingerprint of the user 106, or another biometric, which was originally included in the backup data file and/or which the mobile device 104 is structured to capture (e.g., via a camera, via a fingerprint reader, etc.).

The mobile device 104 is also configured to transmit a restore request to the data service provider 102. The request includes, in this example embodiment, the backup data file, a new public key of a new public-private key pair generated by the mobile device 104 (e.g., a new DPub key of a new DPub/DPri key pair, etc.), the signed biometric from the authentication provider 108 (e.g., including a biometric service ID therefore and/or associated with the authentication provider 108, etc.), and the new device identifier.

In turn, the data service provider 102 is configured to check the signature on the biometric, as consistent with the authentication provider 108. The data service provider 102 is also configured to check an integrity of the backup data file using the signature in the backup file with the public key of the public-private key pair previously generated by the mobile device 104 (e.g., the DPub key of the DPub/DPri key pair generated by the mobile device 104 in creating the backup data file, etc.), for example, in implementations where the mobile device 104 signed the concatenation of the L4 file(s), the L1 file, and the L1 key using the private key of the public-private key pair previously generated by the mobile device 104. The data service provider 102 is configured to then unwrap the L1 key by a private key included in the data service provider 102 (i.e., the private key of the data service provider public/private key pair) and to decrypt the L1 file with the L1 key. The L1 file includes the biometric, whereby the data service provider 102 is configured to compare the signed captured biometric from the restore request with the biometric included in the L1 file. The data service provider 102 is configured to decrypt the L2 file with the L2 key (obtained from the decrypted L1 file) when there is a match, but to issue an error or failure message when there is not a match.

When the L2 file is decrypted, the data service provider 102 is configured to display the masked contact attribute to the user 106, at the mobile device 104, via the application 110. In response, the user 106 provides the masked characters to the data service provider 102. The data service provider 102, in turn, is configured to generate a one-time-password (OTP) and to transmit the OTP to the user 106, via the contact attribute (e.g., the masked contact attribute plus the characters from the user 106, etc.). The user 106, upon receipt of the OTP, then provides the OTP back to the data service provider 102 (e.g., via the data file application 110, etc.).

The data service provider 102 is configured to verify the OTP and to decrypt the L3 file(s) with the unmasked contact attribute, which was verified by the OTP. The data service provider 102 is configured to revise a user entry in the repository 114 to include the new device identifier (and annotate the prior device identifier as restored) from the restore request, and the new public-private key pair generated by the mobile device 104 (e.g., a new DPub key of a new DPub/DPri key pair, etc.) from the restore request, etc. The data service provider 102 is configured to wrap the L4 key, from the L3 file, with the new public key received with the restore request and to return the backup data file (including the encrypted L4 file(s)) and the wrapped L4 key to the mobile device 104.

The mobile device 104 is configured, by the application 110, to unwrap the L4 key (e.g., with the corresponding new private key of the new public-private key pair generated by the mobile device 104, etc.) and to decrypt the attributes (e.g., PII, etc.) included in the backup data file, i.e., the L4 file(s), using the L4 key. Additionally, the mobile device 104 is configured to store the decrypted attributes in secure memory of the mobile device 104, as a new, or updated, or restored data file, for use by the mobile device 104 and/or application(s) therein. The mobile device 104 is further configured to clear temporary memory, so that the keys, attributes, etc., are deleted, except for the data file.

Figure 2:
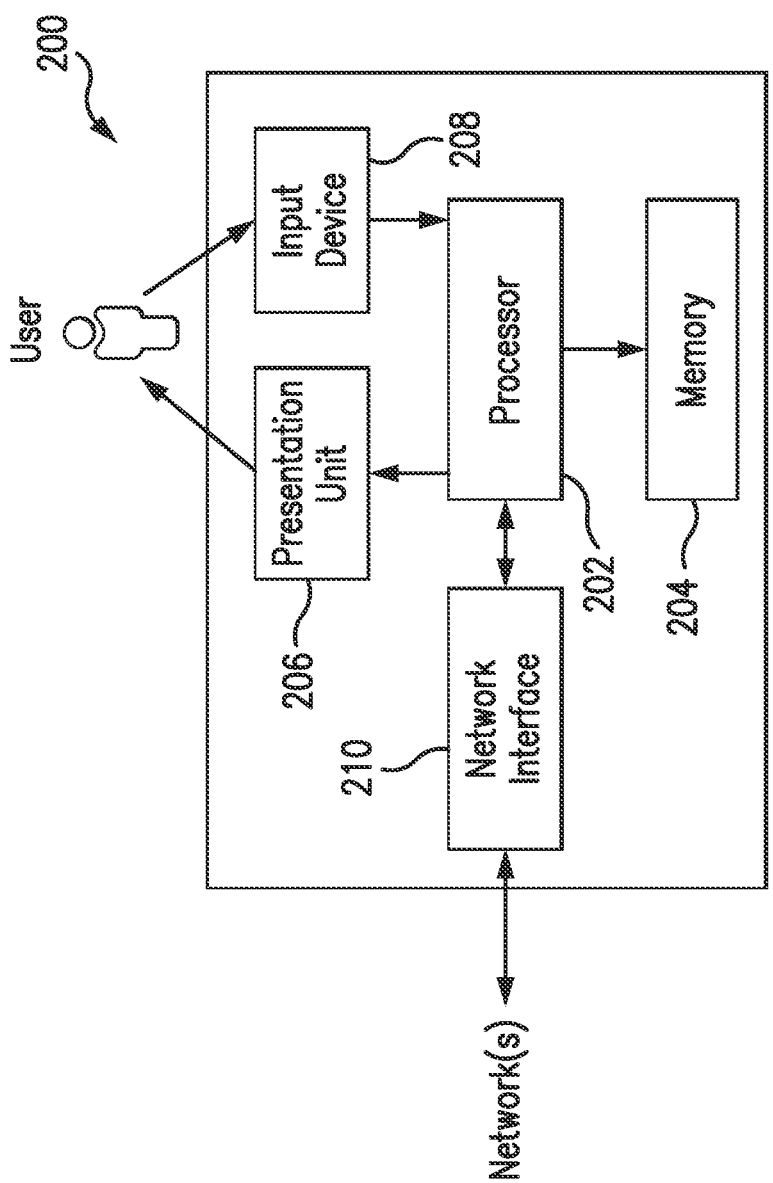
FIG. 2 is a block diagram of an example computing device that may be used in the system of FIG. 1.

FIG. 2 illustrates an example computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the example embodiment of FIG. 1, each of the data service provider 102, the mobile device 104, the authentication provider 108, the storage device 112, and the repository 114 should be understood to include, or as being implemented or embodied in, a computing device at least partially consistent with the computing device 200, coupled to (and in communication with) one or more of the networks. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identity details and data related to identities of users, biometrics, keys, backup data filed, attributes, and/or other types of data (and/or data structures) suitable for use as described herein. Furthermore, in various embodiments, computer-executable instructions (e.g., in the form of applications (e.g., application 110, etc.), etc.) may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein (e.g., one or more of the operations of method 300, one or more of the operations of method 500, etc.), whereby upon (or in connection with) performing such operation(s) the computing device 200 may be transformed into a special purpose computing device. It should be appreciated that the memory 204 may include a variety of different memories, each implemented in one or more of the functions or processes described herein.

In the example embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., prompts to the user 106 at the mobile device 104, etc.), etc. And various interfaces (e.g., as defined by the application 110, etc.) (e.g., including instructions to the user 106, etc.) may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user 106 (i.e., user inputs) of the computing device 200 such as, for example, selections of attributes, biometrics, etc., or other inputs, as further described below. The input device 208 may include a single input device or multiple input devices. The input device 208 is coupled to (and is in communication with) the processor 202 and may include, for example, one or more of a keyboard, a pointing device, a mouse, a camera, a touch sensitive panel (e.g., a touch pad or a touch screen, etc.), another computing device, and/or an audio input device. In various example embodiments, a touch screen, such as that included in a tablet, a smartphone, or similar device, may behave as both the presentation unit 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a Bluetooth™ adapter, etc.), a mobile network adapter, or other device capable of communicating to one or more different ones of the networks herein and/or with other devices described herein. In some example embodiments, the computing device 200 may include the processor 202 and one or more network interfaces incorporated into or with the processor 202.

Figure 3:
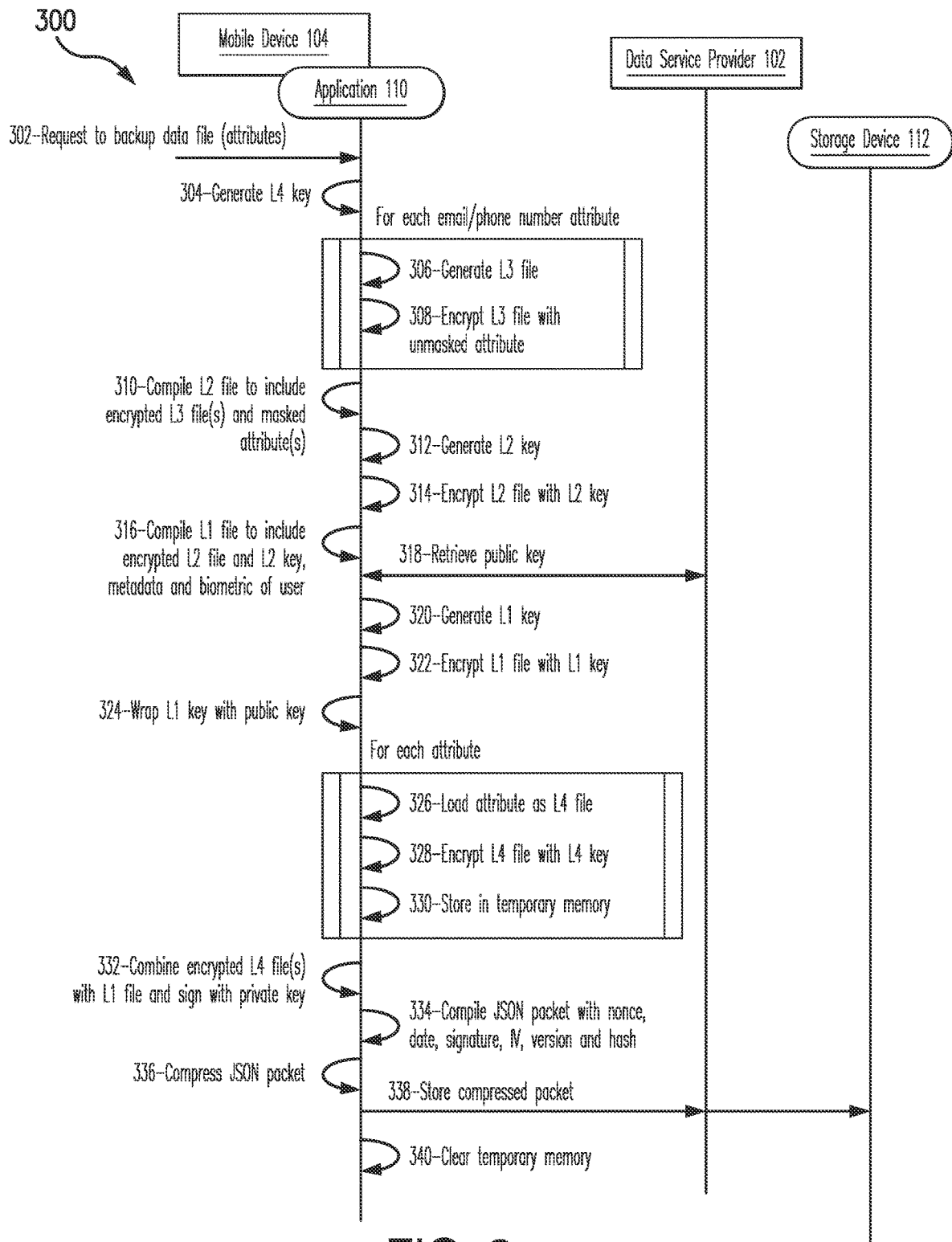

FIG. 3 illustrates an example method 300 for use in securing identifying information of a user in a backup data file, for restoration of the identifying information to one or more hosts. The example method 300 is described as implemented in the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the example method 300.

At the outset, it should be appreciated that the user 106 has employed the application 110, or another application associated therewith, to compile identifying information into the mobile device 104. As explained above, the identifying information, for example, in the form of a data file, may include a number of attributes of an identity of the user 106 (e.g., PII of the user 106, etc.). For example, the data file may include, without limitation, a name, address, phone number, email address, date of birth, place of birth, biometric, height, weight, hair color, eye color, gender, race, government identifier, employer identifier, account identifiers (e.g., insurance account number, payment account number, etc.), etc., for the user 106. The data file is generally included in the mobile device 104, for use by the mobile device 104 in connecting with one or more parties, and/or for engaging in one or more services, etc.

In connection therewith, the user 106 may opt to secure the data file into a backup data file for purposes of restoration if the mobile device 104 is lost, damaged, or otherwise inaccessible, or an application included therein becomes inaccessible, etc. In either instance, the backup data file may be restored to a new host, including, for example, and without limitation, a new mobile device, or different application on the mobile device 104, etc.

At 302, then, the user 106 requests to backup the data file, including the various attributes, through the application 110 and/or the data service provider 102. The request may include a designation of the data file, or an identification of specific attributes or information in the data file to be included in the backup data file. The request is received at the application 110, in the mobile device 104, whereupon, the mobile device 104 generates, at 304, an L4 key. The L4 key may include an AES key, RSA key, or other suitable key, generated at random or not, by the mobile device 104, consistent with one or more techniques for generating keys.

It should be understood that while the method 300 is described with reference to the mobile device 104, the method 300, or steps thereof, may be performed by the mobile device 104 as configured by the application 110, as described above. That said, other applications, or parts of applications, or SDKs, may be employed in the mobile device 104 to perform certain ones of the steps described herein (whereby the other applications, or parts of applications, or SDKs configure the mobile device 104 to operate as described herein).

That said, after generating the L4 key, the mobile device 104, for each contact attribute in the data file (e.g., phone number, email address, or other attribute by which the user 106 may be contacted, etc.), generates, at 306, an L3 file including the L4 key and one or more identifiers associated with the user 106 and/or the mobile device 104 (e.g., a user ID, a device ID, etc.), and then encrypts, at 308, the L3 file with an un-masked version of the given contact attribute. In particular, the contact attributes may be masked through one or more techniques, by which a masked contact attribute includes certain characters masked over. In one example, the unmasked version of the user's phone number may be 44 078 13579 987, while 44 078 13* 987 may be a masked version of the attribute. In another example, the unmasked version of the user's email address may be john.doe@email.com, while john.*@email.com may be a masked version of the attribute. It should be appreciated that various different mask techniques may be employed, with various degrees of masking and/or obfuscation of the attribute. Further, the L3 file includes the generated L4 key and a user identifier (or UID or user ID) for the user 106 and/or a device identifier (or DevID) for the mobile device 104.

When each of the contact attributes are employed to encrypt each corresponding L3 file (e.g., providing multiple encrypted L3 files, potentially, etc.), the mobile device 104 compiles, at 310, an L2 file, including each of the encrypted L3 files and the masked contact attributes for the specific encrypted L3 files. In turn, the mobile device 104 generates an L2 key (e.g., an AES key, a RSA key, a combination thereof, another suitable key, etc.), at 312, and encrypts the L2 file with the L2 key, at 314.

The mobile device 104 then compiles, at 316, an L1 file, with the encrypted L2 file, the L2 key, metadata for the file(s) and a biometric of the user 106. The biometric, in this embodiment, may include a facial image or selfie of the user 106, but may include another biometric (e.g., fingerprint, voiceprint, etc.) in other embodiments (e.g., as previously obtained from the user 106, as associated with the data file of the user 106, etc.). In addition, as shown in FIG. 3, the mobile device 104 retrieves, at 318, a public key from the data service provider 102. The public key is the public key of a key pair (e.g., a data service provider public/private key pair, etc.), for which the data service provider 102 maintains the private key. The mobile device 104 then generates an L1 key (e.g., an AES key, a RSA key, a combination thereof, another suitable key, etc.), at 320, and encrypts the L1 file, at 322, with the L1 key. Next, as shown, the mobile device 104 wraps (or encrypts) the L1 key with the public key retrieved from the data service provider 102, at 324.

Also in the method 300, the mobile device generates or compiles the L4 file(s) based on the data file at the mobile device 104 (e.g., where each L4 file includes an attribute or combination of attributes of the data file, etc.). And, the mobile device 104 encrypts the data from the data file in the L4 file(s) with the L4 key.

In particular in the illustrated embodiment, for each attribute included in the data file, the mobile device 104 loads, at 326, the attribute from memory of the mobile device 104 (e.g., accesses, retrieves, etc. the attribute from/ for the data file) as an L4 file (or to create, generate, compile, etc. an L4 file). The mobile device 104 then encrypts, at 328, the L4 file(s) with the L4 key. And, the encrypted attribute is stored in temporary memory, at 330. The mobile device 104 then repeats steps 326-330 for each additional attribute in the data file (to be backed up). That said, the attribute of the data file included in the L4 file may include a single element of the user's data file (e.g., a name, an address, a date of birth, etc.), such that multiple L4 files may be generated with respect to the user's data file, or it may include a collection elements of the user's data file, for example, depending on how the elements are organized, stored, etc. in the data file (e.g., an attribute may include all elements relating to financial information of the user 106, all elements relating to medical information of the user, etc.). What's more, in some example embodiments, the attribute may include all elements of the user's data file (where a single L4 file represents the user's data file).

After encrypting the L4 file for each attribute in the data file, the mobile device 104 is configured to combine the resulting L4 file(s) and the L1 file, at 332 (e.g., into a file archive, etc.). The files may be combined by concatenating the files, in series, or through other suitable techniques, etc. And, the mobile device 104 may then sign the concatenation of files with a private key of a public-private key pair generated by the mobile device 104 (e.g., the DPri key of the DPub/DPri key pair generated by the mobile device 104, etc.).

The mobile device 104 next compiles, at 334, a json packet (e.g., an info.json packet, etc.), in this embodiment, with a nonce, date, signature, version, initialization vector (IV) (e.g., to ensure that a same value encrypted multiple times, even with the same secret key, will not always result in the same encrypted value; etc.), and a hash (e.g., a JSON Web Token (JWT) hash to verify the integrity of the info.json packet, etc.), and stores the json packet in temporary memory. The mobile device 104 then compresses the json packet, and the combined L4 and L1 files (e.g., consistent with the zip format, etc.), at 336 and stores the compressed packet in the storage device 112, at 338, as designated by the user 106.

Then, at 340, the mobile device 104 clears temporary memory, so that the keys, attributes, etc., are deleted, except for as included in the backup data file, and also except for the data file included in secure memory of the mobile device 104 for use by the mobile device 104.

Figure 4:
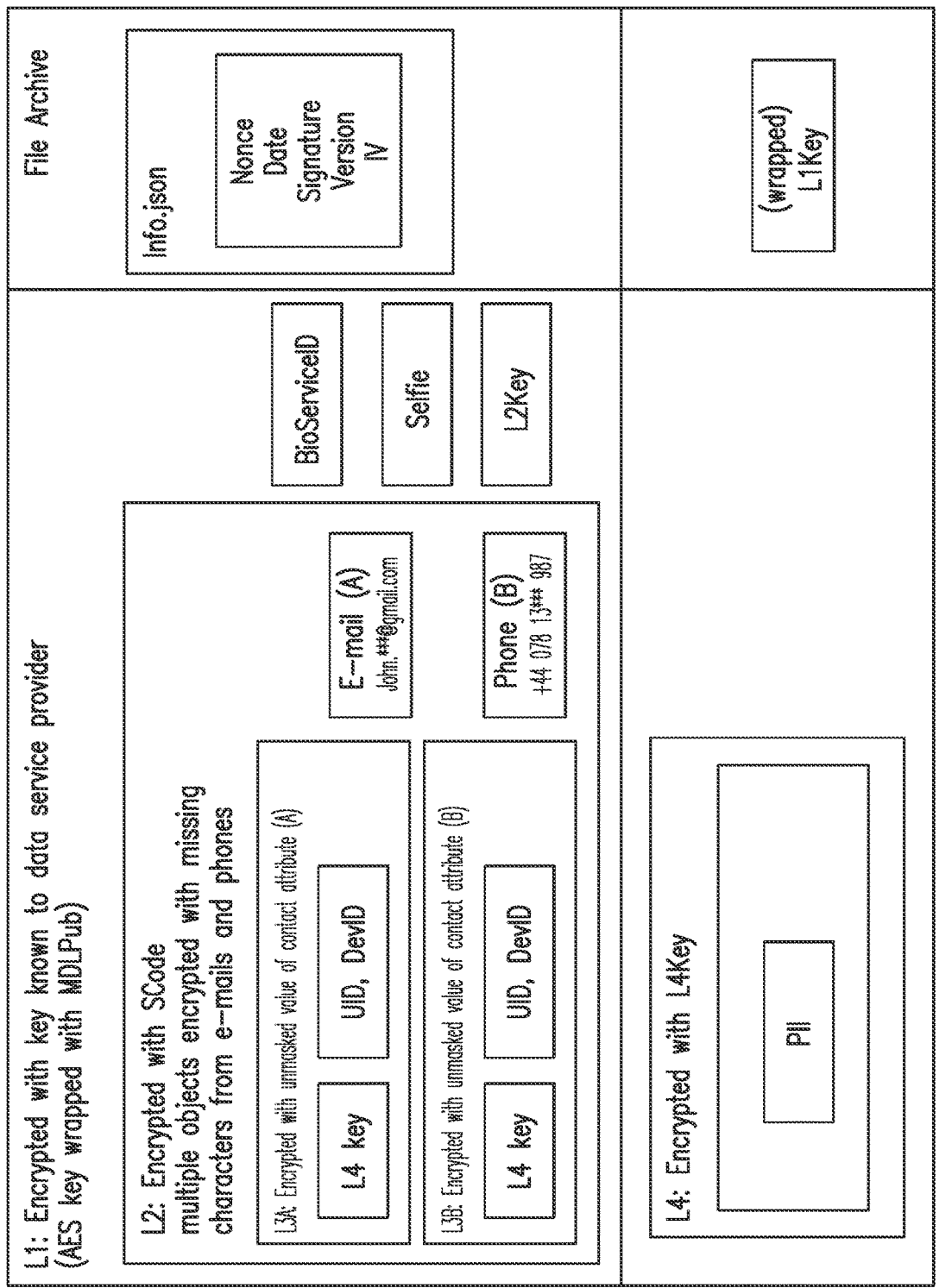
FIG. 4 illustrates securing a backup data file a block diagram of an example backup data file, including multiple layered keys, as constructed by way of the system of FIG. 1 and/or the method of FIG. 3.

FIG. 4 illustrates a diagram of an example backup data file 400. As shown, the backup data file 400 includes layered security, which relies on the different keys referenced in the system 100 and the method 300. Specifically, the L4 key is included in each L3 file (e.g., L3A, L3B, etc.) along with a user ID for the user 106 (i.e., UID, etc.) and a device ID for the mobile device 104 (i.e., DevID, etc.). In this example, there are two L3 files, one encrypted with the unmasked email address for the user 106, and the other encrypted with the unmasked phone number for the user 106. As shown, the two L3 files along with the masked email address and the masked phone number, in this example, are included in the L2 file. The L2 file is then encrypted with the L2 key, and the encrypted L2 file, the L2 key, a biometric (e.g., a selfie, etc.), and the biometric service ID (BioServiceID) relating to the authentication provider 108 are then compiled into the L1 file. As further shown, the L1 file is encrypted with the L1 key. And, the L1 key is wrapped (or encrypted) with the public key of the public-private key pair from the data service provider 102.

With continued reference to FIG. 4, the identifying information for the user 106, or attributes of the user's data file (e.g., PII for the user, etc.), is included in the L4 file(s) and wrapped (or encrypted) with the L4 key. Each of the encrypted attributes (or L4 files), the L1 file, the L1 key, and the info.json packet (as described in the method 300) is combined into the backup data file 400. In doing so, the L4 file(s) alone (or as combined with the L1 file and L1 key) may be signed with the private key of the public-private key pair generated by the mobile device 104 (e.g., the DPri key of the DPub/DPri key pair generated by the mobile device 104, etc.).

It should be appreciated, from FIG. 4, that the example backup data file 400 includes layers of security, each provided by different keys and/or attributes, which are provided to help ensure that the attributes of the user's identity are secured and restored only when the layers of security are each satisfied (generally in order). That said, it should be appreciated that a different number of layers (e.g., two layers, three layers, eight layers, etc.), in various orders, and/or other techniques, may be employed in other backup data file embodiments to provide security and/or secured restoration of the data included therein.

Figure 5:
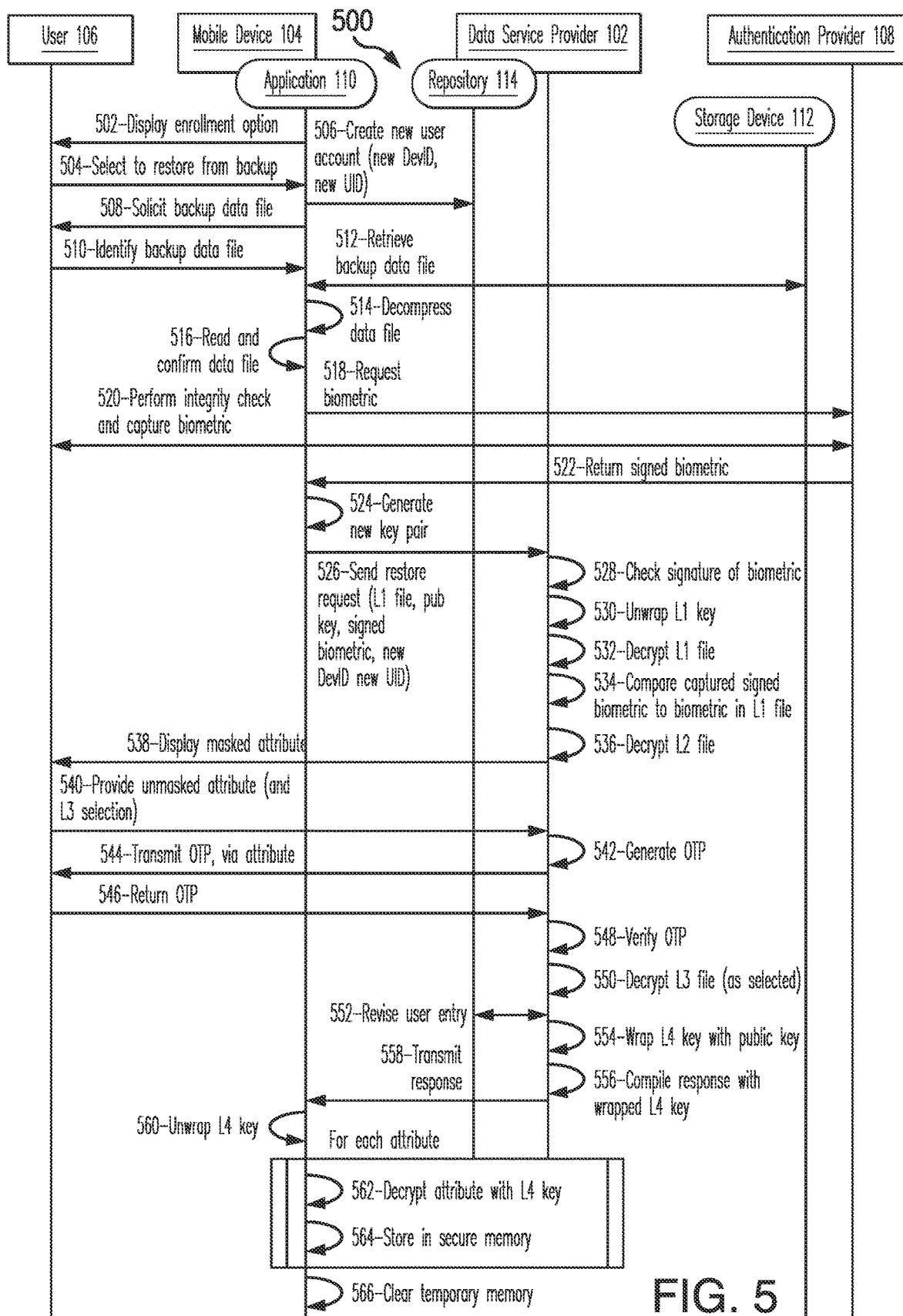
FIG. 5 illustrates an example method, which may be implemented in connection with the system of FIG. 1, for restoring a backup data file.

FIG. 5 illustrates an example method 500 for use in restoring attributes from a backup data file, to a host (e.g., a mobile device, etc.). The example method 500 is described as implemented in the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the example method 500.

At the outset in method 500, the user 106 has acquired a new mobile device 104, or reset the mobile device 104 to a factory reset, or otherwise possessed the mobile device 104, which is devoid of a data file including the identifying attributes of the user 106. Upon accessing the mobile device 104, the user 106 may access the application 110, installed in the mobile device 104, whereby the mobile device 104 displays an enrollment option to the user 106, at 502. The enrollment option may permit the user 106 to create a new profile for the user 106, whereby new attributes would be added and verified, as needed, or (in the context of the present disclosure) it may permit the user 106 to enroll through restoration of a backup data file.

In this example, the user 106 selects to restore a backup data file, at 504, whereupon, the mobile device 104 creates a new user account for the user 106, at 506, and stores data indicative of the new account to the repository 114 (via the data service provider 102, etc.). For example, the mobile device 104 may provide a new user ID for the user 106 (i.e., UID, etc.) and a device ID for the mobile device 104 (i.e., DevID, etc.).

Thereafter, the mobile device 104 solicits, at 508, the backup data file from the user 106. In response, the user 106 identifies the backup data file, at 510, to the mobile device 104. This may include identifying the backup data file by name in the storage device 112, which is accessible through a network connection (e.g., as a cloud storage device, etc.), or which may include physically linking or connecting the storage device 112 to the mobile device 104, and identifying the backup date file by name or other designation in the storage device 112, etc. In turn, the mobile device 104 retrieves, at 512, the backup data file.

The mobile device 104 then decompresses the backup data file, at 514, which may include, for example, in this embodiment, unzipping the backup data file, etc. The mobile device 104 then reads and confirms the backup data file, at 516. For example, the mobile device 104 may confirm the contents of the info.json packet, and verify the integrity of the backup data file based on the hash from the info.json packet (e.g., using the public key of the public-private key pair previously generated by the mobile device 104 (e.g., the DPub key of the DPub/DPri key pair generated by the mobile device 104 during creation of the original ID profile or during a last restore, etc.), etc.).

The mobile device 104 then works, generally, in reverse of compilation of the backup data file in method 300. For example, at 518, the mobile device 104 requests a biometric from the authentication provider 108. In turn, the authentication provider 108 interacts with the user 106, via the mobile device 104, to perform an integrity check and to capture a biometric, at 520 (e.g., a facial image or selfie of the user 106, etc.). The integrity check may include a liveness check, to ensure that the user 106 providing the biometric is indeed a live person, and that the biometric is not being captured from a photograph, for example. At, 522, the authentication provider 108 returns a signed biometric to the mobile device 104. It should be appreciated that in at least one embodiment, the mobile device 104 may perform the integrity check and/or capture the biometric, or may rely on the data service provider 102 to perform the integrity check and/or capture the biometric, etc.

Next, as shown in FIG. 5, the mobile device 104 generates, at 524, a new key pair, including a new public key and a new private key (e.g., a new DPub/DPri key pair, etc.).

At 526, the mobile device 104 sends a restore request to the data service provider 102, where the request includes the backup data file (uncompressed), the newly generated public key, and the new UID and DevID, etc. In response, in this example embodiment, the data service provider 102 checks, at 528, the signature of the biometric (as signed by the authentication provider 108 (e.g., based on the biometric service ID for the authentication provider 108, etc.)). The data service provider 102 also unwraps (or checks the signature on) the backup data file using the public key of the public-private key pair previously generated by the mobile device 104 (e.g., the DPub key of the DPub/DPri key pair generated by the mobile device 104 in creating the backup data file, etc.). And, in turn, the data service provider 102 unwraps, at 530, the L1 key based on knowledge of the public key used to wrap the L1 key, i.e., by having the corresponding private key. The data service provider 102 then uses the L1 key to decrypt the L1 file, at 532, thereby providing access to the biometric included in the L1 file and the L2 key.

With access to the L1 file, the data service provider 102 compares, at 534, the captured signed biometric to the biometric included in the L1 file (e.g., directly or via the authentication provider 108 by way of the biometric service ID included in the request, etc.). In response to a match, the data service provider 102 decrypts, at 536, the L2 file using the L2 key (included in the L2 file).

The data service provider 102 then displays, at 538, via the application 110, one or more of the masked contact attributes to the user 106, via the mobile device 104. In connection therewith, the data service provider 102 requests the user 106 to fill in the masked characters of the contact attribute. For example, where the masked contact attribute includes John.***@email.com, as above, the data service provider 102 is soliciting "john.doe" to complete the email address. In response, at 540, the user 106 provides the unmasked contact attribute, along with an L3 selection. For example, when an email contact attribute and a phone number contact attribute are displayed to the user 106, the user 106 has the option to complete the masked characters for only one of the contact attributes. In this example, the user 106 provides the masked characters of the email address, at 540, thereby selecting the L3 file associated with the email address (rather than the L3 file associated with the phone number). It should be appreciated that the user 106 may be solicited to provide the masked characters in more than one contact attribute in other embodiments, for example, as still further security for the restoration of the backup data file. It should also be appreciated that a limited number of attempts may also be imposed, as to providing masked characters for the contact attributes.

Upon receipt of the masked characters, the data service provider 102 generates, at 542, a one-time password (OTP) (e.g., a temporary OTP, etc.) and transmits, at 544, the OTP to the user 106, via the contact attribute, as unmasked by the user 106. That is, the data service provider 102 may add the unmasked characters from the user 106 to the masked contact attribute and simply transmit the OTP (without verifying the contact attribute, thereby omitting a requirement that the data service provider 102 knows the unmasked contact attribute outside of the user's response). The OTP may be randomly generated, or otherwise generated to provide suitable security, etc. The user 106 then accesses the email account, or otherwise realizes the OTP being provided to the contact attribute, and returns the same to the data service provider 102, at 546.

The returned OTP is then verified, by the data service provider 102, at 548. When verified, the data service provider 102 is informed that the unmasked contact attribute, as provided by the user 106, is correct, whereby the data service provider 102 decrypts the respective L3 file with the unmasked contact attribute, at 550. Here, again, because the user 106 provided the masked characters of the email address, whereby the L3 file encrypted with the email address is selected. The data service provider 102 then accesses the decrypted L4 key and UID and DevID (from the prior mobile device 104, for example) in the L3 file.

In connection therewith, the data service provider 102 revises, at 552 the user entry in the repository 114. In particular, in this embodiment, the data service provider 102 marks the prior DevID as restored for the prior UID in the repository 114, adds the new DevID to the prior UID as active, replaces the old public key with the new public key, and then marks the new UID as deleted. In this manner, the UID is maintained for the user 106 in the repository 114, and the new DevID is added to the entry.

After, or prior, or at the same time as updating the repository 114, the data service provider 102 wraps, at 554, the L4 key with the new public key received from the mobile device 104 in the restore request (sent at 526), and compiles a response to the restore request, at 556. The response includes the wrapped L4 key, an indication that the response includes the wrapped L4 key, and the backup data file (including the L4 file(s)). The data service provider 102 transmits the compiled response to the mobile device 104, at 558.

At 560, the mobile device 104 unwraps the L4 key with the new private key, as generated at step 524. The mobile device 104 is then able to decrypt the L4 file (or L4 files), at 562, and to store the attribute(s) included in the L4 files, at 564, in secure memory of the mobile device 104. As shown in FIG. 5, the mobile device 104 is permitted to repeat steps 562 and 564 for each L4 file included in the backup data file. And, then, when complete, at 566, the mobile device 104 clears the temporary memory of the keys, attributes, etc., thereby leaving only the attributes in secure memory which are accessible to the mobile device 104 as needed and/or as provided by the user 106, etc.

In view of the above, the systems and methods herein provide for enhanced security backup for data files, through use of layered multi-factor authentication. In particular, by providing a layered encryption, the backup data file employs a mixture of verifying attributes (e.g., contact attributes, biometrics, etc.), along with keys revealed either by the contact attributes or the data service provider associated with the backup data file, etc. In connection therewith, the systems and methods provide for multi-factor authentication in connection with restoration of the backup data file. For example, possession of the backup data file may be provided at the outset, as the user supplies the backup data file. Further, inherence is provided with the biometric authentication, which may include matching between the new facial image from a liveness check, and the old facial image signed and securely stored in the backup fata file. Further still, knowledge is provided by asking the user to fill in the missing/masked characters of the contact attributes.

What's more, the attributes protected by the backup data file are platform, host and application agnostic, whereby a backup data file may be compiled in a first mobile device having a first operating system, and then restored in a second mobile device having a different operating system. The restore may be completed to another application, etc., or broadly, to another host, whereby the attributes, upon satisfying the security included at the various layers, become available to the host, etc.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, by a computing device, a restore request from a mobile device of a user, the restore request including: (i) a backup data file having an L1 file, a wrapped L1 key, and at least one L4 file including one or more attributes of the user, (ii) a public key of a first key pair, and (iii) a sample biometric associated with the user; (b) unwrapping, by the computing device, the wrapped L1 key, with a private key of a second key pair; (c) decrypting, by the computing device, the L1 file via the L1 key, wherein the L1 file includes a reference biometric associated with the user and an L2 file; (d) verifying, by the computing device, the sample biometric included in the restore request against the reference biometric; (e) in response to the verification of the sample biometric, decrypting, by the computing device, the L2 file, wherein the L2 file includes a contact attribute for the user and an L3 file; (f) verifying, by the computing device, the contact attribute with the user; (g) in response to verification of the contact attribute by the user, decrypting, by the computing device, the L3 file using the contact attribute, wherein the L3 file includes an L4 key; (h) wrapping, by the computing device, the L4 key with the public key included in the restore request; (i) transmitting the wrapped L4 key to the mobile device, thereby permitting the mobile device to decrypt the at least one L4 file based on the L4 key, access the one or more attributes of the user included in the at least one L4 file, and provision the one or more attributes to the mobile device; (j) checking, by the computing device, a signature associated with the sample biometric prior to verifying the sample biometric; (k) providing, by the computing device, the contact attribute to the user, via the mobile device, and soliciting masked characters of the contact attribute; (l) receiving the masked characters of the contact attribute from the user; (m) transmitting, by the computing device, a one-time password (OTP) to the user, via the unmasked contact attribute, based on the received masked characters; and (n) receiving the OTP from the user and using the OTP to verify the contact attribute.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in securing a backup data file, the method comprising:
   receiving, by a mobile device, a request to backup a data file;
   generating, by the mobile device, an L4 key;
   for each contact attribute of the data file:
      generating, by the mobile device, an L3 file including the L4 key and an identifier associated with a user; and
      encrypting, by the mobile device, the L3 file with an un-masked version of the contact attribute;
   compiling, by the mobile device, the encrypted L3 file(s) and the masked version(s) of the contact attribute(s) into an L2 file;
   generating, by the mobile device, an L2 key;
   encrypting, by the mobile device, the L2 file with the L2 key;
   compiling, by the mobile device, the encrypted L2 file and L2 key into an L1 file;
   generating, by the mobile device, an L1 key;
   encrypting, by the mobile device, the L1 file with the L1 key;
   compiling, by the mobile device, an L4 file to include multiple identity attributes of the user;
   encrypting, by the mobile device, the L4 file with the L4 key;
   combining, by the mobile device, the encrypted L4 file and the encrypted L1 file;
   signing, by the mobile device, the combination of the encrypted L4 file and the encrypted L1 file with a private key;
   compressing, by the mobile device, the combined L4 and L1 files; and
   storing, by the mobile device, the compressed files in a storage device apart from the mobile device.

2. The computer-implemented method of claim 1, wherein the data file includes at least two contact attributes; and
    wherein the at least two contact attributes include a phone number and an email address, each associated with the user.

3. The computer-implemented method of claim 1, wherein the masked version(s) of the contact attribute(s) includes the contact attribute(s) with multiple characters being masked.

4. The computer-implemented method of claim 1, wherein compiling the encrypted L2 file and the L2 key into the L1 file includes compiling the encrypted L2 file, the L2 key, and a sample biometric into the L1 file; and
    wherein the sample biometric includes a facial image of the user.

5. The computer-implemented method of claim 1, further comprising:
    retrieving a public key from a data service provider; and
    wrapping, by the mobile device, the L1 key with the public key;
    wherein combining the encrypted L4 file and the L1 file further includes combining the wrapped L1 key; and
    wherein the storage device is associated with a data storage provider.

6. The computer-implemented method of claim 1, further comprising storing the encrypted L4 file in temporary memory of the mobile device, prior to compressing the combined L4 and L1 files; and
    clearing the temporary memory of the mobile device after storing the compressed files in the storage device.

7. The computer-implemented method of claim 6, wherein combining the encrypted L4 file and the L1 file includes concatenating the L4 and L1 files in series.

8. The computer-implemented method of claim 6, further comprising:
    compiling, by the mobile device, a JSON packet with a nonce, a date, a signature and a version and storing the JSON packet in temporary memory; and
    wherein compressing the combined L4 and L1 files includes compressing the combined L4 and L1 files and JSON packet.

9. The computer-implemented method of claim 1, wherein the identity attributes include a date of birth, a government identifier, an employer identifier, and/or one or more account identifiers.

10. A non-transitory computer-readable storage medium including executable instructions for securing a backup data file, which when executed by at least one processor of a mobile device, cause the at least one processor to:
    receive a request to backup a data file;
    generate an L4 key;
    for each contact attribute of the data file:
        generate an L3 file including the L4 key and an identifier associated with a user; and
        encrypt the L3 file with an un-masked version of the contact attribute;
    compile the encrypted L3 attribute(s) and the masked version(s) of the contact attribute(s) into an L2 file;
    generate an L2 key;
    encrypt the L2 file with the L2 key;
    compile the encrypted L2 file and L2 key into an L1 file;
    generate an L1 key;
    encrypt the L1 file with the L1 key;
    compile an L4 file to include multiple identity attributes of the user;
    encrypt the L4 file with the L4 key;
    combine the encrypted L4 file and the encrypted L1 file;
    sign the combination of the encrypted L4 file and the encrypted L1 file with a private key;
    compress the combined L4 and L1 files; and
    store the compressed files in a storage device apart from the mobile device.

11. The non-transitory computer-readable storage medium of claim 10, wherein the data file includes at least two contact attributes; and
    wherein the at least two contact attributes include a phone number and an email address, each associated with the user.

12. The non-transitory computer-readable storage medium of claim 10, wherein the masked version(s) of the contact attribute(s) includes the contact attribute(s) with multiple characters being masked.

13. The non-transitory computer-readable storage medium of claim 10, wherein the executable instructions, when executed by the at least one processor, cause the at least one processor to compile the encrypted L2 file, the L2 key, and a sample biometric into the L1 file; and
    wherein the sample biometric includes a facial image of the user.

14. The non-transitory computer-readable storage medium of claim 13, wherein the executable instructions, when executed by the at least one processor, further cause the at least one processor to:
    retrieve a public key from a data service provider; and
    wrap the L1 key with the public key;
    wherein the executable instructions, when executed by the at least one processor, further cause the at least one processor to combine the encrypted L4 file and the L1 file with the wrapped L1 key; and
    wherein the storage device is associated with a data storage provider.

15. The non-transitory computer-readable storage medium of claim 10, wherein the executable instructions, when executed by the at least one processor, cause the at least one processor to:
    store the encrypted L4 file in temporary memory of the mobile device, prior to compressing the combined L4 and L1 files; and
    clear the temporary memory of the mobile device after storing the compressed files in the storage device.

16. The non-transitory computer-readable storage medium of claim 10, wherein the executable instructions, when executed by the at least one processor, cause the at least one processor, in order to combine the encrypted L4 file and the L1 file, to concatenate the L4 and L1 files in series.

17. The non-transitory computer-readable storage medium of claim 16, wherein the executable instructions, when executed by the at least one processor, cause the at least one processor to:
    compile a JSON packet with a nonce, a date, a signature and a version and storing the JSON packet in temporary memory; and
    compress the combined L4 and L1 files with the JSON packet.

18. The non-transitory computer-readable storage medium of claim 10, wherein the identity attributes include a date of birth, a government identifier, an employer identifier, and/or one or more account identifiers.

* * * * *